US009635106B2

United States Patent
Lakshmegowda et al.

(10) Patent No.: US 9,635,106 B2
(45) Date of Patent: Apr. 25, 2017

(54) IDENTIFYING ONE OR MORE PEER DEVICES IN A PEER-TO-PEER COMMUNICATION

(71) Applicant: Tata Consultancy Services Limited, Mumbai (IN)

(72) Inventors: Nandini Heragu Lakshmegowda, Bangalore (IN); Sathish Vallat, Bangalore (IN); Shalin Garg, Bangalore (IN); Mohammed Yousuf Shariff, Bangalore (IN); Annie Thomas, Bangalore (IN)

(73) Assignee: Tata Consultancy Services Limited, Mumbai, IN (US)

( * ) Notice: Subject to any disclaimer, the term of this patent is extended or adjusted under 35 U.S.C. 154(b) by 263 days.

(21) Appl. No.: 14/504,492

(22) Filed: Oct. 2, 2014

(65) Prior Publication Data

US 2015/0100637 A1    Apr. 9, 2015

(30) Foreign Application Priority Data

Oct. 3, 2013  (IN) .......................... 3138/MUM/2013

(51) Int. Cl.
*G06F 15/16*   (2006.01)
*H04L 29/08*   (2006.01)
(Continued)

(52) U.S. Cl.
CPC .... *H04L 67/1044* (2013.01); *G06F 17/30247* (2013.01); *G06Q 20/223* (2013.01);
(Continued)

(58) Field of Classification Search
None
See application file for complete search history.

(56) References Cited

U.S. PATENT DOCUMENTS 8,493,353 B2   7/2013 Blanchflower et al.
2011/0225069 A1   9/2011 Cramer et al.
(Continued)

FOREIGN PATENT DOCUMENTS

WO   WO/2013/154476 A1   10/2013

OTHER PUBLICATIONS

Michael Stolle, Lukas Zühlke, "Mobile Payment in an Augmented Reality", http://www.atmia.com/clientuploads/b_newsletter/consult_apr13/moble_payment.html; pp. 1-2; SHC Stolle & Heinz Consultants GmBH & Co. KG.

(Continued)

*Primary Examiner* — Umar Cheema
*Assistant Examiner* — Anthony Rotolo
(74) *Attorney, Agent, or Firm* — Shumaker, Loop & Kendrick, LLP

(57) ABSTRACT

Systems and methods for facilitating peer-to-peer communication are disclosed. A payor and a payee may establish a communication request with intent to execute a transaction in a P2P payment. The payee and the payor may transmit a first request and a second request respectively to an intermediary server to establish the communication. Based on the first request and the second request, the intermediary server sends one or more identification elements to the payee and payor. The payee and payor are identified at intermediary server as parties for P2P payment after an augmented reality (AR) experience and a resultant synchronized action that sends first trigger request and second trigger request from the respective devices.

11 Claims, 9 Drawing Sheets

(51) Int. Cl.
    *G06F 17/30*     (2006.01)
    *H04W 4/20*     (2009.01)
    *H04W 12/06*     (2009.01)
    *G06Q 20/22*     (2012.01)
    *G06Q 20/32*     (2012.01)

(52) U.S. Cl.
    CPC ......... *G06Q 20/327* (2013.01); *H04L 67/141* (2013.01); *H04W 4/206* (2013.01); *H04W 12/06* (2013.01)

(56) References Cited

U.S. PATENT DOCUMENTS

| | | | |
|---|---|---|---|
| 2011/0320290 A1 | 12/2011 | Mehew et al. | |
| 2012/0284175 A1* | 11/2012 | Wilson | G06Q 20/10 705/39 |
| 2013/0002717 A1 | 1/2013 | Deffeyes et al. | |
| 2014/0108247 A1* | 4/2014 | Artman | G06Q 20/36 705/44 |
| 2014/0337235 A1* | 11/2014 | Van Heerden | G06Q 20/10 705/71 |
| 2015/0019432 A1* | 1/2015 | Burns | G06Q 20/3278 705/44 |
| 2016/0217617 A1* | 7/2016 | Barribeau | G06F 3/04815 |

OTHER PUBLICATIONS

Dr. Enrico Rukzio, "Mobile Interaction with the Real World"; pp. 1-50; Lancaster University (UK).

Neal Applefeld, "Four Ways to Reinvent Retail Marketing through Augmented Reality"; Sep. 12, 2013; pp. 1-5; Spin Sucks Professional Development for PR and Marketing Pros.

* cited by examiner

IDENTIFYING ONE OR MORE PEER DEVICES IN A PEER-TO-PEER COMMUNICATION

CROSS-REFERENCE TO RELATED APPLICATIONS AND PRIORITY

The present application claims priority from Indian Patent Application No. 3138/MUM/2013 filed on Oct. 3, 2013.

FIELD OF INVENTION

The present disclosure relates to a field of peer-to-peer communication. More particularly, the present disclosure relates to a system and a method for facilitating communication between one or more peer devices.

BACKGROUND

With advent in technology, payment for goods and services has been made possible electronically. Use of making payments electronically has provided consumers with a much more efficient method of paying for the goods and services that they consume. After much adaptation of the technology, many institutions accept electronic fund payments in variety of means. For example, the electronic fund payments are accepted by means of credit cards, telephone banking or more direct payment from an electronic purse of a consumer to an account of a goods or service provider. Further, there exists other alternative methods to make payments; such as Automated Clearing House (ACH), money transfers using existing electronic banking systems e.g., via electronic wire transfer are often used for transfers of large sums of money. For transfers of smaller sums of money, existing electronic banking systems are often costly and inconvenient.

Apart from the technologies described above for making the payments electronically, Person-to-person (P2P) payments allows consumers to transfer electronic funds. Specifically, the Person-to-person (P2P) payment is an online technology that allows customers e.g., payor and payee to transfer funds from their bank account or credit card to another. In the existing methods, in order to execute the P2P payments, the payor registers the payee through at least one of a plurality of registration identifiers such as email address, bank account number, credit card, phone number, social media profile or someone in their contact list etc. In the above mentioned methods, the P2P payments have the risk of sharing personal information and dependent on the payor registering the correct identifier of the payee. Mistyping a recipient's identifier would transfer funds to a wrong recipient. The existing methods include convoluted processes and involve multiple channels to register and identify the payee. Further, the payee identification may include an additional authentication factor for processing the payment request.

Few of the existing methods used to establish communication between devices based on "at the same time, at the same place" include motion detection based, acceleration based, time and location-based techniques. Other methods of communication include near field communications, Bluetooth, Wi-Fi etc. However, the existing methods do not disclose facilitating peer-to-peer communication by an intermediary server based on an augmented reality.

SUMMARY

Without limiting scope, disclosed are exemplary systems and methods facilitating communication between one or more peer devices and the concepts are further described below in the detailed description.

In one implementation, a method for facilitating peer-to-peer communication is disclosed. The method comprises identifying a first peer device and a second peer device at an intermediary server. The first peer device and the second peer device are identified by receiving a first request and a second request from the first peer device and the second peer device respectively. The first request and the second comprise a communication intent. The method further comprises transmitting one or more identification elements to the first peer device and the second peer device by the intermediary server, by initializing a timeout period. The method further comprises receiving a first trigger request and a second trigger request from the first peer device and the second peer device respectively at the intermediary server. The first trigger request and the second trigger request are generated by a touch/tactile event during an augmented reality interaction of the first peer device and the second peer device respectively. The first trigger request and the second trigger request are indicative of a synchronized action. The first trigger request and the second trigger request comprise attributes corresponding to the first peer device and the second peer device. The method further comprises matching the attributes present in the first trigger request of the first peer device and the second trigger request of the second peer device at the intermediary server to establish the synchronized action of the first peer device and the second peer device. The method further comprises forming a peer group of the first peer device and the second peer device based on the attributes matched. The peer group is formed within the timeout period. The method further comprises transmitting a response message from the intermediary server, to the first peer device in response to the first trigger request from the first peer device and to the second peer device in response to the second trigger request from the second peer device. For a successful peer group formation, the response message comprising details corresponding to the first peer device are transmitted to the second peer device, or vice versa, wherein the response message is transmitted in the peer group to facilitate peer-to-peer communication.

In one implementation, an intermediary server for facilitating peer-to-peer communication is disclosed. The intermediary server comprises a processor and a memory coupled to the processor. The processor is capable of executing program instructions stored in the memory, to identify a first peer device and a second peer device at the intermediary server. The first peer device and the second peer device are identified, by receiving a first request and a second request from the first peer device and the second peer device respectively. The first request and the second comprise a communication intent. The processor further executes the program instructions to transmit one or more identification elements to the first peer device and the second peer device by initiating a timeout period. The processor further executes the program instructions to receive a first trigger request and a second trigger request from the first peer device and the second peer device respectively. The first trigger request and the second trigger request are generated by a touch/tactile event during an augmented reality interaction of the first peer device and the second peer device respectively. The first trigger request and the second trigger request are indicative of a synchronized event/action. The first trigger request and the second trigger request comprise attributes corresponding to the first peer device and the second peer device respectively. The processor further executes the program instructions to match the attributes present in the first trigger request of the first peer device and the second trigger request of the second peer device to establish the synchronization action of the first peer device and the second peer device. The processor further executes the program instructions to form a peer group of the first peer device and the second peer device based on the attributes matched. The peer group is formed within the timeout period. The processor further executes the program instructions to transmit a response message from the server to the first peer device in response to the first trigger request from the first peer device and to the second peer device in response to the second trigger request from the second peer device. For a successful peer group formation, the response message comprising details corresponding to the first peer device is transmitted to the second peer device, or vice versa. The response message is transmitted in the peer group to facilitate peer-to-peer communication.

In one implementation, a method for establishing peer-to-peer communication through an intermediary server is disclosed. The method comprises transmitting a first request from a first peer device to an intermediary server. The first request is associated with communication intent. The method further comprises receiving identification elements of the first peer device from the intermediary server. The method further comprises enabling an augmented reality experience with a second peer device using the identification elements, by displaying an invisible interface on a fiducial and prompting a user of the second peer device to access the invisible interface on the fiducial of the first peer device. The access creates a primary event for the first peer device. Creation of the primary event induces a secondary event. The secondary event is captured by the sensing means of the second peer device. The primary event and the secondary event indicate a synchronized action performed at an instant that is same at the first peer device and the second peer device. The method further comprises transmitting a first trigger request from the first peer device to the intermediary server. The first trigger request comprises attributes corresponding to the first peer device. The method further comprises receiving a response message for the first trigger request, by the first peer device, from the intermediary server. The response message comprises details of the second peer device to establish peer-to-peer communication.

In one implementation, a first peer device for establishing peer-to-peer communication through an intermediary server is disclosed. The first peer device comprises a display, a processor and a memory coupled to the processor. The processor is capable of executing program instructions stored in the memory. The program instructions are executed to enable the first peer device to transmit a first request, to an intermediary server, associated with communication intent. The program instructions are executed to receive identification elements of the first peer device from the intermediary server. The program instructions are further executed to enable an augmented reality experience with a second peer device using the identification elements, by displaying an invisible interface on a fiducial on the display of the first peer device and prompting a user of the second peer device to access the invisible interface on the fiducial. The access creates a primary event for the second peer device. The creation of the primary event induces a secondary event. The secondary event is captured by a sensing means of the second first peer device. The primary event and the secondary event indicate a synchronized action performed at an instant that is same at the first peer device and the second peer device. The program instructions are further executed to transmit a first trigger request to the intermediary server. The first trigger request comprises attributes corresponding to the first peer device. The program instructions are further executed to receive a response message for the first trigger request, from the intermediary server. The response message comprises details of the second peer device to establish peer-to-peer communication.

In one implementation, a method for establishing a peer-to-peer communication with peer devices through an intermediary server is disclosed. The method comprises transmitting a second request from a second peer device to an intermediary server. The second request is associated with a communication intent. The method further comprises receiving identification elements of the second peer device from the intermediary server. The method further comprises enabling an augmented reality experience with a first peer device using the identification elements, by viewing a display of the first peer device displaying a fiducial with an invisible interface through a sensing means of the second peer device. The second peer device displays a concealed interface of the fiducial when transcending over the invisible interface of the fiducial of the first peer device. The enabling further comprises prompting a user of the second peer device to access the fiducial on the first peer device. The fiducial is viewed using an optical/sensing means of the second peer device. The access creates a primary event for the first peer device. The primary event further creates/induces a secondary event captured by the sensing means on the second peer device. The primary event and the secondary event indicate a synchronized action performed at an instant that is same at the first peer device and the second peer device. The method further comprises transmitting a second trigger request from the second peer device to the intermediary server. The second trigger request comprises attributes associated to the second peer device. The method further comprises receiving a response message for the second trigger request, by the second peer device, from the intermediary server. The response message comprises details of the first peer device to establish peer-to-peer communication.

In one implementation, a second peer device for establishing a peer-to-peer communication through an intermediary server is disclosed. The second peer device comprises a processor and a memory coupled to the processor. The processor is capable of executing program instructions stored in the memory. The processor executes a program instruction to transmit a second request from a second peer device to an intermediary server. The second request is associated with a communication intent. The processor further executes a program instruction to receive identification elements of the second peer device from the intermediary server. The processor further executes a program instruction to enable an augmented reality experience with a first peer device using the identification elements, by viewing a display of the first peer device a fiducial with an invisible interface through a sensing means of the second peer device. The second peer device displays a concealed interface of the fiducial when transcending over the invisible interface of the fiducial of the first peer device. The execution further comprises prompting a user of the second peer device to access the fiducial. The fiducial is viewed using an optical/sensing means of the second peer device. The access creates a primary event for the first peer device. The primary event further creates/induces a secondary event captured by the sensing means on second peer device. The primary event and the secondary event indicate a synchronized action performed at an instant that is same at the first peer device and the second peer device. The processor further executes a program instruction to transmit a second trigger request to the intermediary server. The second trigger request comprises attributes associated to the second peer device. The processor further executes a program instruction to receive a response message for the second trigger request, from the intermediary server. The response message comprises details of the first peer device to establish peer-to-peer communication.

BRIEF DESCRIPTION OF DRAWINGS

The detailed description is provided with reference to the accompanying figures. In the figures; the left-most digit(s) of a reference number identifies the figure in which the reference number first appears. The same numbers are used throughout the drawings to refer like/similar features and components.

DETAILED DESCRIPTION

Figure 1:
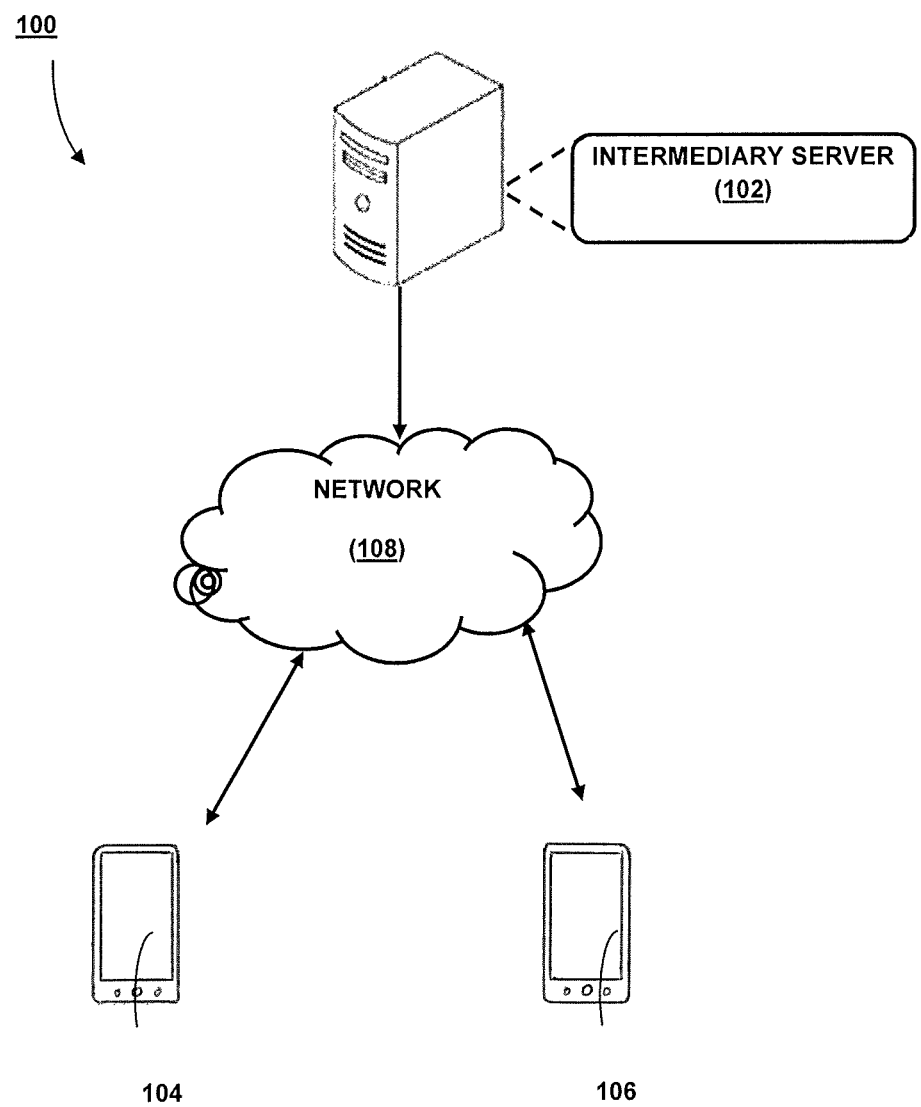
FIG. 1 illustrates a network implementation of an intermediary server, in accordance with an embodiment of the present disclosure.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Disclosed are systems and methods for facilitating peer-to-peer communication are disclosed. At first, a payor and a payee may transmit a first request and a second request respectively to an intermediary server to establish the communication. The first request and the second request may be transmitted using a first peer device and a second peer device associated with the payee and the payor respectively. Upon receiving the first request or second request at the intermediary server, a timeout counter is initialized at the server. The time out period may indicate a time within which the communication should be established. Based on the first request and the second request and their communication intent, the intermediary server generates and transmits one or more identification elements to the first peer device and the second peer device. The one or more identification elements may comprise a token.

The first peer device of the payee may receive the token comprising a unique identifier from the intermediary server. Upon receiving the token, the first peer device may display an AR marker on a display of the first peer device. The AR marker may comprise an invisible interface rendered on a fiducial visible on a display means of the first peer device. The payor may use the second peer device to view the augmented content on the display of the first peer device. The payor may access the invisible interface on the first peer device by viewing through an optical/sensing means of the second peer device. After obscuring the invisible interface on the display of the first peer device by the second peer device, a set of virtual buttons may be displayed on the second peer device. The payor taps the virtual buttons on the display of the first peer device, it and as a result of the tap, an augmented reality interaction is created. The tap indicates a primary event that induces a secondary event to confirm that the touch/tactile activity has occurred to the touch/tactile confirmation indicate a synchronized action performed by the first peer device and the second peer device. The secondary event is caused by the primary event to ensure that hover events or accidental touches at places other than the area of the invisible interface are filtered out before sending the trigger requests.

After accessing the invisible interface on the first peer device, the first peer device may transmit a first trigger request to the intermediary server. The first trigger request may comprise attributes corresponding to the first peer device. In response to the first trigger request, the intermediary server may transmit the first trigger request to the second peer device. Similarly, the second peer device may transmit a second trigger request to the intermediary server. The second trigger request may comprise attributes corresponding to the second peer device. In response to the second trigger request, the intermediary server may transmit the second trigger request to the first peer device.

If the attributes of the first peer device and the second peer device match, the intermediary server may form a peer group of the first peer device and the second peer device. After forming the peer group, the first peer device may transmit a response message to the intermediary server. The response message may comprise details corresponding to the first peer device. Upon receiving the details from the first peer device, the intermediary server may transmit the response message to the second peer device. Similarly, the second peer device may transmit a response message to the intermediary server. The response message may comprise details corresponding to the second peer device. Upon receiving the details from the second peer device, the intermediary server may transmit the response message to the first peer device. Based on the response message, the first peer device and the second per device may establish communication to execute the transaction.

While aspects of described system and method for facilitating peer-to-peer communication may be implemented in any number of different computing systems, environments, and/or configurations, the embodiments are described in the context of the following exemplary system.

Referring now to FIG. 1, a network implementation 100 of an intermediary server 102 for facilitating peer-to-peer communication is illustrated, in accordance with an embodiment of the present disclosure. The intermediary server 102 may identify a first peer device and a second peer device. The intermediary server 102 may identify the first peer device and the second peer device by receiving a first request and a second request from the first peer device and the second peer device respectively. Based on the first request and the second request, the intermediary server 102 may transmit one or more identification elements to the first peer device and the second peer device.

The intermediary server 102 may receive a first trigger request and a second trigger request from the first peer device and the second peer device respectively. The first trigger request and the second trigger request may be generated by a touch/tactile event during an augmented reality interaction of the first peer device and the second peer device respectively. The first trigger request and the second trigger request may be indicative of a synchronized action. The first trigger request and the second trigger request comprise attributes corresponding to the first peer device and the second peer device. The intermediary server 102 may match the attributes present in the first trigger request of the first peer device and the second trigger request of the second peer device to establish the synchronized action of the first peer device and the second peer device.

Based on the attributes matched, the intermediary server 102 may form a peer group of the first peer device and the second peer device. The peer group may be formed within the timeout period. The intermediary server 102 may transmit a response message to the first peer device in response to the first trigger request from the first peer device and to the second peer device in response to the second trigger request from the second peer device, in the peer group to facilitate peer-to-peer communication.

Although the present disclosure is explained by considering a scenario that the intermediary server 102 is implemented as an application. It may be understood that the intermediary server 102 may also be implemented as a variety of computing systems, such as a laptop computer, a desktop computer, a notebook, a workstation, a mainframe computer, a server, a network server, and the like. It will be understood that the intermediary server 102 may be accessed by multiple users through one or more peer devices such as a first peer device 104 and a second peer device 106 or applications residing on the first peer device 104 and the second peer device 106. In one example, the first peer device 104 may include, but are not limited to, a portable computer, a multitouch surface, a personal digital assistant, a handheld device, and a workstation. In one example, the second peer device 106 may include, but are not limited to, a portable computer, a multitouch surface, a personal digital assistant, a handheld device, and a workstation. The first peer device 104 and the second peer device 106 are communicatively coupled to the intermediary server 102 through a network 108.

In one implementation, the network 108 may be a wireless network, a wired network or a combination thereof. The network 108 can be implemented as one of the different types of networks, such as intranet, local area network (LAN), wide area network (WAN), the internet, and the like. The network 108 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
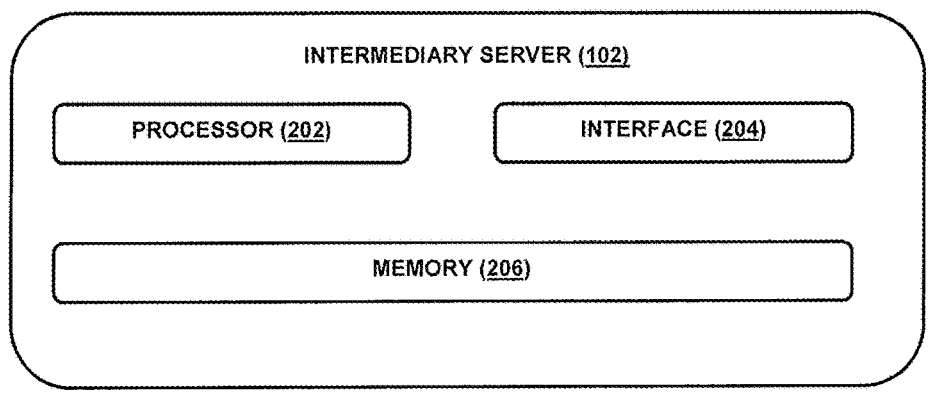
FIG. 2 illustrates the intermediary server, in accordance with an embodiment of the present disclosure.

Referring now to FIG. 2, the intermediary server 102 is illustrated in accordance with an embodiment of the present disclosure. In one embodiment, the intermediary server 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the intermediary server 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 3:
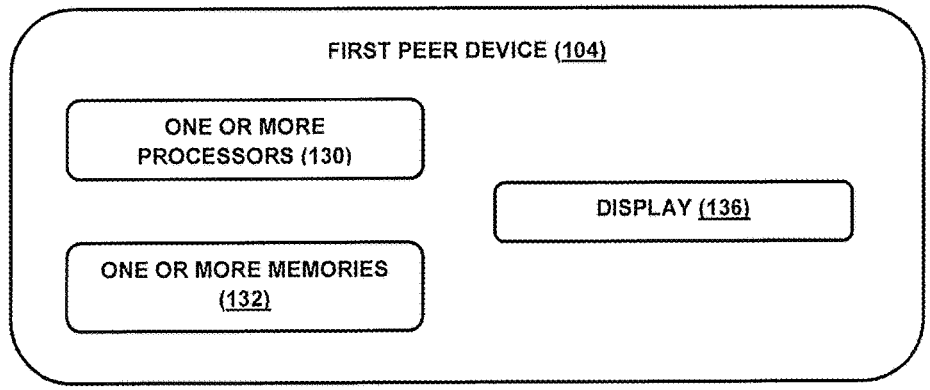
FIG. 3 illustrates a first peer device, in accordance with an embodiment of the present disclosure.

Referring now to FIG. 3, the first peer device 104 is illustrated in accordance with an embodiment of the present disclosure. In one embodiment, the first peer device 104 may include one or more processors 130, one or more memories 132, and a display 136. The one or more processors 130 may be implemented as one or more microprocessors, microcomputers, microcontrollers, digital signal processors, central processing units, state machines, logic circuitries, and/or any devices that manipulate signals based on operational instructions. Among other capabilities, the one or more processors 130 are configured to fetch and execute computer-readable instructions stored in the one or more memories 132.

The one or more memories 132 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The display 136 may include a LCD display, a LED display and other displays that are obvious to persons skilled in the art.

Figure 4:
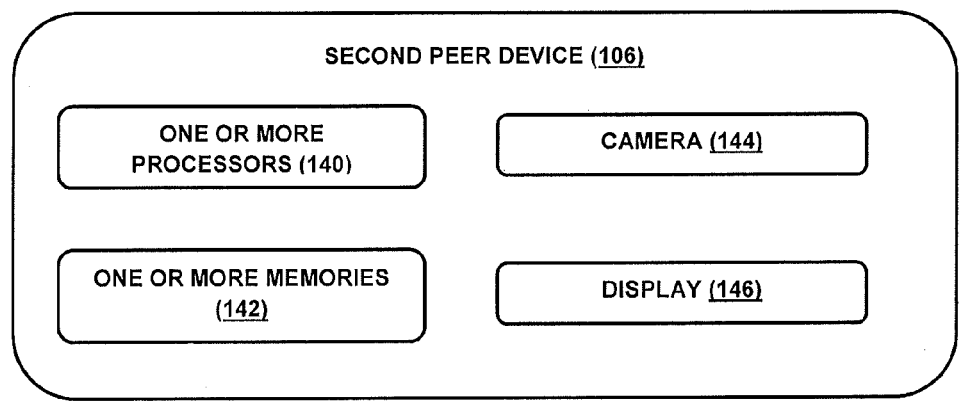
FIG. 4 illustrates a second peer device, in accordance with an embodiment of the present disclosure.

Referring now to FIG. 4, the second peer device 106 is illustrated in accordance with an embodiment of the present disclosure. In one embodiment, the second peer device 106 may include one or more processors 140, one or more memories 142, at least one camera or optical sensing means 144, and a display 146. The one or more processors 130 may be implemented as one or more microprocessors, microcomputers, microcontrollers, digital signal processors, central processing units, state machines, logic circuitries, and/or any devices that manipulate signals based on operational instructions. Among other capabilities, the one or more processors 140 are configured to fetch and execute computer-readable instructions stored in the one or more memories 142.

The one or more memories 142 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The at least one camera or optical sensing means 144 may comprise an optical sensor (not shown) to capture one or more images and store the one or more images in the one or more memories 142. The display 146 may include a LCD display, a LED display and other displays that are obvious to persons skilled in the art.

As presented above, the intermediary server 102 may communicate with the first peer device 104 and the second peer device 106 via the network 108. In one implementation, the network 108 may be secured by use of secure protocol such as HTTPS. The network 108 may be accessed by the first peer device 104 and the second peer device 106 using a secure channel (SSL/TLS) based on a public key cryptography. The secure channel may be used to protect the communication from Man in the Middle (MITM) attacks. The secure channel may be used to protect messages from being tampered or intercepted, when the messages are exchanged between the intermediary server 102 the first peer device 104 and the second peer device 106.

In one implementation, at first, a user of first peer device 104 may send/transmit a first request to the intermediary server 102. The user of the first peer device 104 may send/transmit the first request to establish a communication with another user. In one implementation, the other user may send/transmit a second request from a second peer device 106 to the intermediary server 102. In one example, the user of the first peer device 104 may be a payee and the other user may be a payor intended to communicate to execute a transaction. The transaction may comprise fund transfers, online payment, third party money transfers, wire transfers, etc. The transaction may comprise a lending transaction between a borrower and lender; a trading transaction between a buyer and seller; a payment transaction between a payee and payer. It could be understood that the P2P transaction could be extended to multiple LOB (Line of Business) applications like such as banking, retail, education, travel, tourism, and marketplace. The payee or the payor may send the first request and the second request with intent to communicate and execute the transaction. In one example, the first peer device 104 and the second peer device 106 may be associated with users wishing to communicate. In one example, the payor and payee may execute the transaction in a proximity P2P method.

Figure 5:
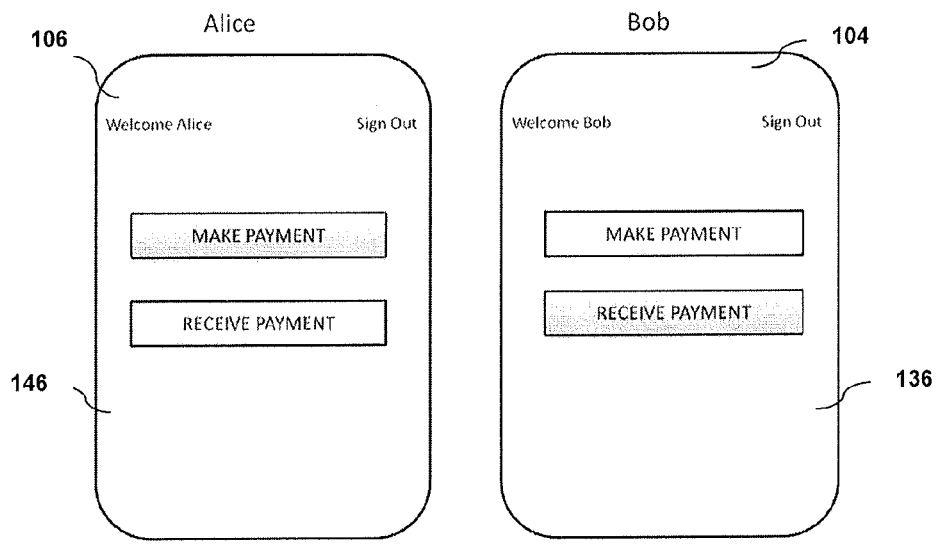
FIG. 5 illustrates the first peer device and the second peer device transmitting a first request and a second request respectively, in accordance with an embodiment of the present disclosure.

In order to illustrate the transmitting the first request and the second request FIG. 5 may be used an example. Specifically, the FIG. 5 illustrates the first peer device 104 of the payee e.g., Bob and the second peer device 106 of the payor e.g., Alice. In one example, Alice and Bob may be associated with a bank wherein Alice and Bob are customers of the bank. In another example, Alice and Bob may execute a particular electronic transaction. In order to initiate the transaction, the payee may initiate the first request to the intermediary server 102 to establish the communication with the payor. The intermediary server 102 may act as a server that stores information pertaining to the payor and the payee. To initiate the transaction, the payee may select to receive payment. Similarly, the payor may initiate the second request to the intermediary server 102 to establish the communication with the payee. In one example, the payor may select to make payment. Based on the first request and the second request, the payor and payee are not identified as P2P parties for the financial transaction, even though the individual peer devices 104 and 106 are identified at the intermediary server 102.

Upon receiving the first request and the second request, the intermediary server 102 may process the first request and the second request and transmit one or more identification elements to the first peer device 104 and the second peer device 106 respectively. In one implementation, the identification elements may be time stamped such that the identification elements transmitted may be used only once.

The one or more identification elements for the first peer device 104 may comprise a device identifier, a server time stamp, a session identifier, a fiducial, an encoded fiducial identifier, etc. The device identifier may include a token to identify the first peer device 104. For example, the device identifier may comprise a unique number corresponding to the first peer device 104. In one implementation, the device identifier may be retrieved from the memory 206. In one implementation, the server timestamp may be the current time at the server based on the server's locale or Coordinated Universal Time (UTC). In one implementation, the time stamp may be digitally signed trusted timestamp issued by a trusted third party. The fiducial may comprise an object that is used in the field of view of an imaging system and which appears in the resulting image. In one implementation, the fiducial may be used for a single time. In another implementation, one fiducial may be sent and the fiducial may be placed randomly on the display 136 for each transaction. The encoded fiducial identifier may indicate a unique identifier for identifying the fiducial that is concealed. In one implementation, the encoded fiducial may be implemented as an indicia such as a two-dimensional code like QR code embedded on the fiducial. In one implementation, the encoding may be standard encoding techniques known in the art such as the Base64 encoding for text data or Ascii85 encoding for binary data.

The one or more identification elements for the second peer device 106 may comprise a device identifier, a server time stamp, and a session identifier. The device identifier may include a token to identify the first peer device 104. For example, the device identifier may comprise a unique number corresponding to the second peer device 106. In one implementation, the device identifier may be retrieved from the memory 206. In one implementation, the server timestamp may be the current time at the server based on the server's locale or Coordinated Universal Time (UTC). In one implementation, the server timestamp may comprise a digitally signed trusted timestamp issued by a trusted third party. After the intermediary server 102 transmits the one or more identifications elements, the timeout period is initialized and tracked at server 102. The first peer device 104 and the second peer device 106 may receive the one or more identification elements.

Figure 6:
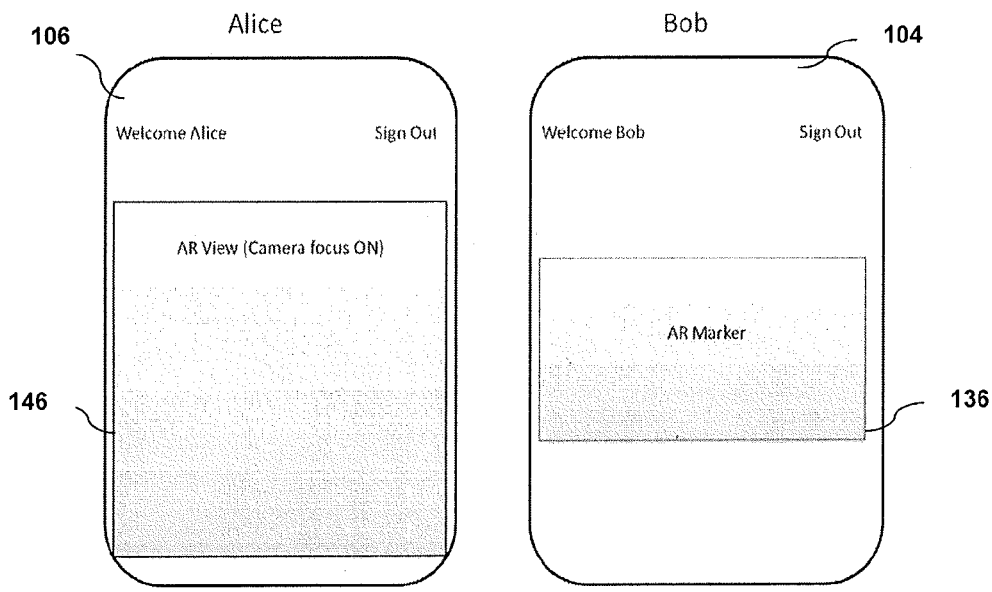
FIG. 6 illustrates the first peer device displaying an AR marker on the display and the AR marker being viewed by the second peer device, in accordance with an embodiment of the present disclosure.

After receiving the one or more identification elements, the first peer device 104 may display the fiducial on the display 136. In one implementation, the fiducial may comprise an invisible interface transcending an image that is not visible to the payee or the payor. In one example, the fiducial may comprise an AR marker. The payor may bring the second peer device 106 on top of the first peer device 104 to view the AR marker i.e., fiducial. In one implementation, when the fiducial is displayed on the first peer device 104, the second peer device 106 switches to an augmented reality view. When the second peer device 106 switches to the AR view, computer-generated virtual content seamlessly emerges on top of the real world view when focused on an appropriate fiducial. The payor may view the AR marker through the at least one camera or optical sensing means 144 of the second peer device 106. In one example, the payor may scan the AR marker using other techniques that recognizes the AR marker. In one example, FIG. 6 may be used to illustrate the AR marker and viewing of the AR marker through the second peer device 106. Specifically, FIG. 6 illustrates the first peer device 104 displaying the AR marker on the display 136. Further, FIG. 6 illustrates the AR marker being viewed by the second peer device 106.

Figure 7:
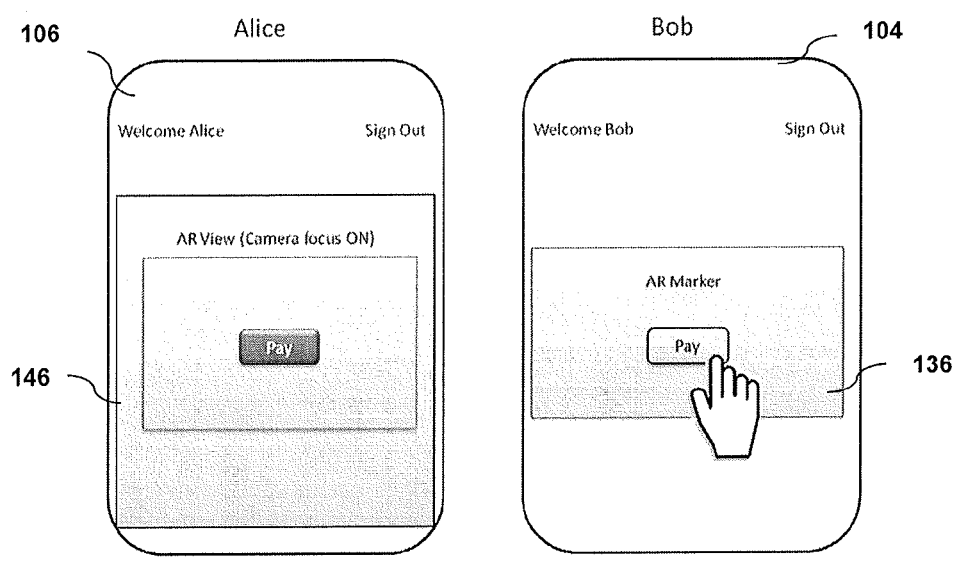
FIG. 7 illustrates displaying a fiducial on the display of the first peer device, in accordance with an embodiment of the present disclosure.

After scanning the AR marker through the at least one camera 144, the second peer device 106 displays the sensed fiducial on the display 146. In one example, the fiducial may be displayed on the second peer device 106 as shown in FIG. 7 for the above example. In one example, the fiducial may comprise a virtual button displayed to the payor. In order to identify first peer device 104 to execute the transaction, the payor may touch/tap the fiducial on the first peer device 104 creating a primary event.

The primary event may induce a secondary event to conform that the tap occurred on the first peer device 104 and the secondary event may be sensed up by the optical means 144 on the second peer device 106. In one implementation, the secondary event is created after the primary event to ensure that hover or gesture events or accidental touches at places other than the area of the invisible interface are filtered out before sending the trigger requests. The primary event and the secondary event may indicate a synchronized action performed at an instant that is same at the first peer device 104 and the second peer device 106.

In one implementation, the touch/tactile may be a tap or gesture provided by the payor. In one implementation, the payor may draw a pattern or a gesture on the display 136. In one implementation, the fiducial may be made tamper-proof that may include patterns, branding, security aspects such as watermark or a picture with a steganographic implementation. In another implementation the fiducial may additionally comprise grids with a secure code that would have to be obscured by the user of the second peer device 106.

Corresponding to the synchronized action caused by the augmented reality interaction, the first peer device 104 may transmit a first trigger request to the intermediary server 102. Similarly, the second peer device 106 may transmit a second trigger request to the intermediary server 102. The first trigger request and the second trigger request may be generated by the touch/tactile event i.e., the primary event and the secondary event during the augmented reality interaction of the first peer device 104 and the second peer device 106 respectively.

In one implementation, the primary trigger request may comprise attributes corresponding to the first peer device 104. In one example, the attributes may comprise primary attributes, secondary attributes and third attributes. The primary attributes in the first trigger request may comprise the device identifier, the session identifier, the communication intent and the time stamp of the first peer device. The secondary attributes present in the first trigger request may comprise the spatial coordinates of the invisible interface rendered on the fiducial displayed on the display 136 of the first peer device 104, and the encoded fiducial identifier of the first peer device 104. The third attributes present in the first trigger request may comprise ambient lighting/illumination, ambient noise, temperature, humidity, screen brightness, atmospheric pressure, altitude and attributes of the invisible interface of the first peer device 104.

In one example, the attributes in the second trigger request may comprise primary attributes, secondary attributes and third attributes. The primary attributes present in the second trigger request may comprise the device identifier, the session identifier, the communication intent and the time stamp of the second peer device 106. The secondary attributes present in the second trigger request may comprise the spatial coordinates of the concealed interface on the fiducial that is sensed by the at least one camera/optical means 144 of the second peer device 106, and the fiducial identifier that is sensed by at least one camera/optical means 144 of the second peer device 106. The third attributes may comprise an ambient lighting/illumination, an ambient noise, temperature, humidity, screen brightness, atmospheric pressure, altitude and attributes of the concealed interface of the second peer device 106.

The attributes received from the first peer device 104 and the second peer device 106 may be checked. If the attributes present in the first trigger request of the first peer device 104 and the second trigger request of the second peer device 106 matches, the intermediary server 102 may form a peer group comprising the first peer device 104 and the second peer device 106. If the attributes present in the first trigger request of the first peer device 104 and the second trigger request of the second peer device 106 does not match, the intermediary server 102 may reinitiate establish the communication between the first peer device 104 and the second peer device 106.

In order to illustrate matching of the attributes of the first peer device 104 and the second peer device 106 to establish the peer-to-peer communication, an example may be used. Specifically, a method 800 may be described to illustrate the first trigger event and the second trigger event. Consider that payee sends a request at step 802. The time to receive the request at the intermediary server 102 may be recorded as shown at step 804. Similarly, the payor may send the second trigger request using the second peer device 106 by selecting make payment as shown at step 806. The time to receive the request at the intermediary server 102 may be recorded as shown at step 808. After receiving the first request and the second request, the intermediary server 102 may calculate delay in the network 108 to connect the first peer device 104 and the second peer device 106 respectively with the intermediary server 102.

After connecting the first peer device 104 and the second peer device 106, the intermediary server 102 may issue identification elements to the payee comprising the fiducial as shown at step 812. Further, the identification elements may be issued to the payor by the intermediary server 102. Subsequently, the intermediary server 102 may receive first trigger request from the payee as shown at step 814. Similarly, the intermediary server 102 may receive second trigger request from the payor as shown at step 816. The trigger requests would arrive independently at the intermediary server 102 and the intermediary server 102 may adjust offsets of the clock considering the network latency for synchronization calculations. After receiving the trigger requests from the payor and the payee, the intermediary server 102 may compare the attributes of the first peer device 104 and the second peer device 106 as shown at 818. If the attributes of the first peer device 104 and the second peer device 106 do not match, the intermediary server 102 may deny to connect the first peer device 104 and the second peer device 106. The payor and the payee may have to re-initiate the payment activity as shown at step 820. If the attributes match, the intermediary server 103 may allow the first peer device 104 and the second peer device 106 to perform the transaction.

Figure 9A:
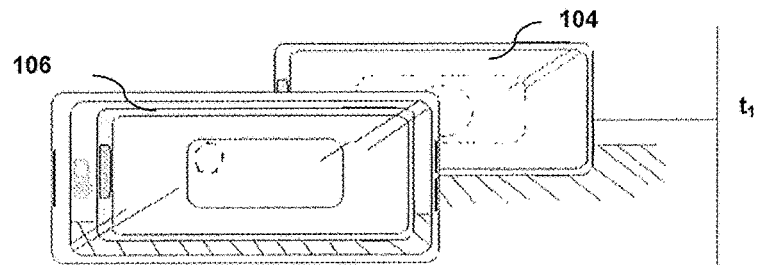
FIGS. 9A, 9B, 9C, and 9D illustrate obscuring the fiducial on the first peer device by the second peer device and transmitting the first trigger request and the second trigger request respectively, in accordance with an embodiment of the present disclosure.

After sending the second request, a random virtual button may appear on the display 146 of the second peer device 106. Similarly, the first peer device 104 may send the first request to the intermediary server 102 at time t1. Based on the first request, the intermediary server 102 may initiate the timeout period $(t_1+\Delta)$ for the first peer device 106 to form peer group with the second peer device 106. In one example, the intermediary server 102 may transmit positional co-ordinates of the AR marker to be displayed on the display 136 of the first peer device 104. In one example, the AR marker may be displayed as shown in FIG. 9A. In another implementation, the intermediary server 102 may determine the timestamp and the positional co-ordinates from the payor for pairing the first peer device 104 and the second peer device 106. Further, the intermediary server 102 may calculate timeout period of $(t_i+\Delta)$.

Figure 9B:
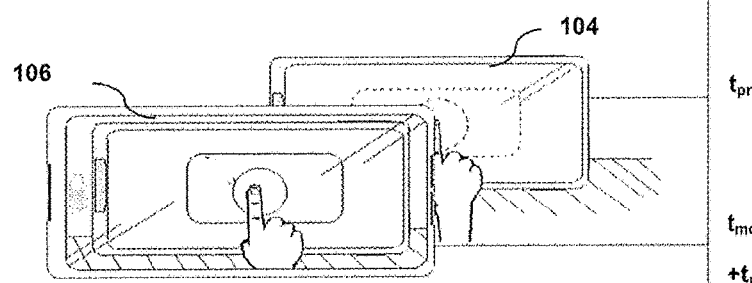

In one implementation, the party intending to be a payor may position the virtual button on the display 446 of the second peer device 106 through gestures on the display 136 of first peer device 104. In order to position the virtual button on the first peer device 106, the payor may drag and drop the virtual button to superimpose or eclipse the fiducial i.e., concealed interface on the first peer device 104. By placing the virtual button on the first peer device 106, an accidental touch within the timeout period of $(t_1+\Delta)$ may be avoided. In one example, the party intending to be a payor may position the virtual button as to eclipse the invisible interface on the first peer device 104 and may touch/tap i.e., the primary event the fiducial as shown in FIG. 9B.

After the primary event is initiated, the secondary event may confirm the augmented reality interaction. The first trigger request and the second trigger request may be sent from the first peer device 104 and the second peer device 106 to the intermediary server 102. To illustrate the occurrences of events at different intervals, in one example, at the first peer device 104: at $t_1$, the intermediary server 102 sends AR marker to the party intending to be a payee. Within $t_1+\Delta$, wherein $\Delta$ indicates timeout period. The first peer device 104 and the second peer device 106 may send the first trigger request and second trigger request from payee (104) and the payor (106) respectively.

$t_{payee} > t_{primary} + \delta_2$ where $t_{primary}$ is the time when the primary event occurred and $t_{primary} > t_1$ and $\delta_2$ is known duration to obtain the secondary event on the first peer device.

In one example, at the second peer device:

$$t_{payor} > t_{move} + t_{primary} + \delta_2 + \delta_3$$

Where $t_{primary}$ is the time when the primary event occurred and $t_{primary} > t_1$ and $\delta_2$ is known duration to obtain the secondary effect on the first peer device and $\delta 3$ is time required for the at least one camera 144 of the second peer device 106 to sense the secondary event on the first peer device. In an embodiment, $t_{move}$ is a later event after t1 for the positioning to occur and may not be measured.

Figure 8:
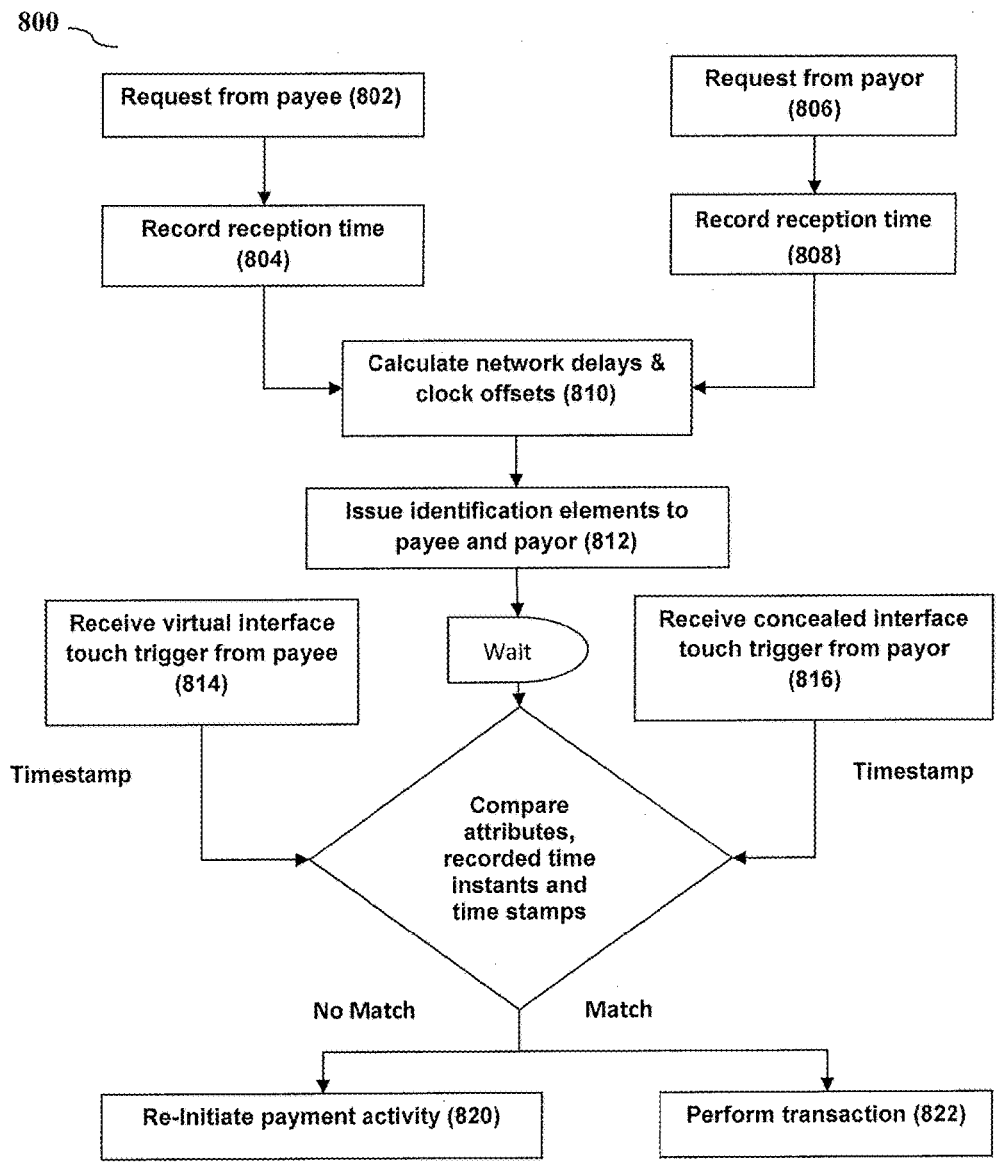
FIG. 8 illustrates a method describing a first trigger event and a second trigger event, in accordance with an embodiment of the present disclosure.
Figure 9C:
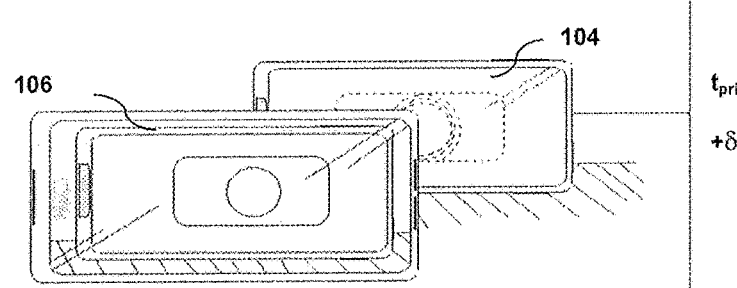
Figure 9D:
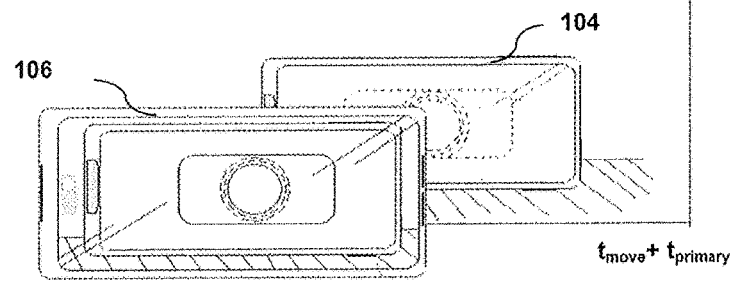

In one example, after the payor touches the fiducial on the second peer device 106, a ripple effect may be observed on the display 136 of the first peer device 104 indicating the secondary event as shown at FIG. 9C i.e., at $t_{primary} + \delta_2$. Further, the ripple effect created as a result of the secondary event may be sensed at the second peer device 106 is shown at FIG. 8D, i.e., $t_{move} + t_{primary} + \delta_2 + \delta_3$.

In one implementation, if the intermediary server 103 receives the first trigger request and the second trigger request i.e., $t_{payor}$ and $t_{payee}$ within the timeout period $(t_1+\Delta)$, in such a scenario, if primary attribute of the payor matches, the payor may be paired with payee as peers. Further, if multiple payor timestamp matches, the payor may be paired with the payee as per guidelines specified at the intermediary server 102. In one example, the payor and payee may not be paired or the payor may be accessed by matching the spatial co-ordinates. In one implementation, if the first trigger request and the second trigger request comprising timestamps, $t_{payor}$ and $t_{payee}$ expires after the timeout period $(t_1+\Delta)$, the trigger requests may be discarded.

After matching the attributes present in the first trigger request of the first peer device 104 and the second trigger request of the second peer device 106, the first peer device 104 and second peer device 106 may form a peer group. Further, in response to the first trigger request and the second trigger request, a response message may be received from the first peer device 104 and the second peer device 106. In one implementation, the response message comprises details corresponding to the first peer device 104 or the second peer device 106. In one example, the response message may be associated with a status code. Further, the response message may be associated with a success message comprising the details corresponding to the matching of the attributes and/or details corresponding to the first trigger request and the second trigger request received after the timeout period. In one example, the response message may be associated with an error message when the communication intent of the first peer device and the second peer device is not known. In another example, the response message may be associated with the error message when the first trigger request and the second trigger request are received at the intermediary server after the time out period. In another example, the response message may be associated with the error message indicating a failure of the matching. The failure of matching may indicate the communication intent being same from the first peer device and the second peer device. In one implementation, the failure of the matching may happen when one or more conditions with respect to the first peer device and the second peer device do not match.

Figure 10:
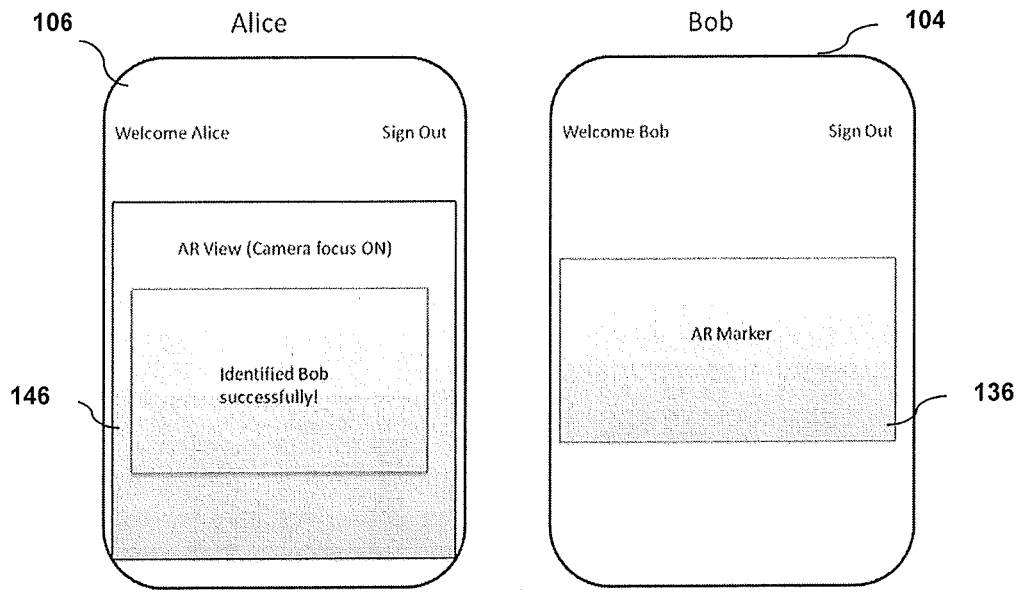
FIG. 10 illustrates peer identification of the payee and the payor, in accordance with an embodiment of the present disclosure.
Figure 11:
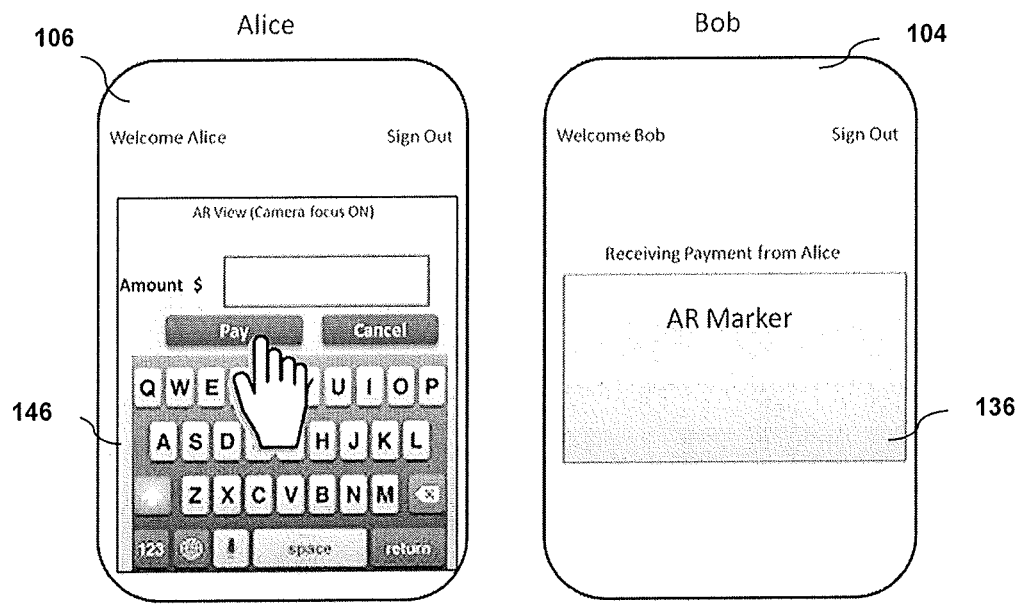
FIG. 11 illustrates payor entering an amount to be transferred on the second peer device, in accordance with an embodiment of the present disclosure.
Figure 12:
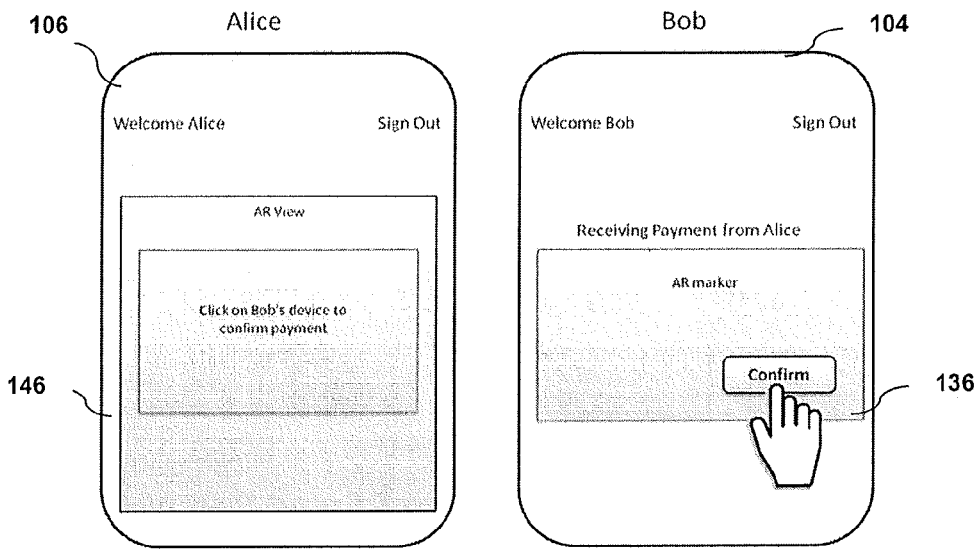
FIG. 12 illustrates appearance of a virtual button on the first peer device to execute a transaction; in accordance with an embodiment of the present disclosure.
Figure 13:
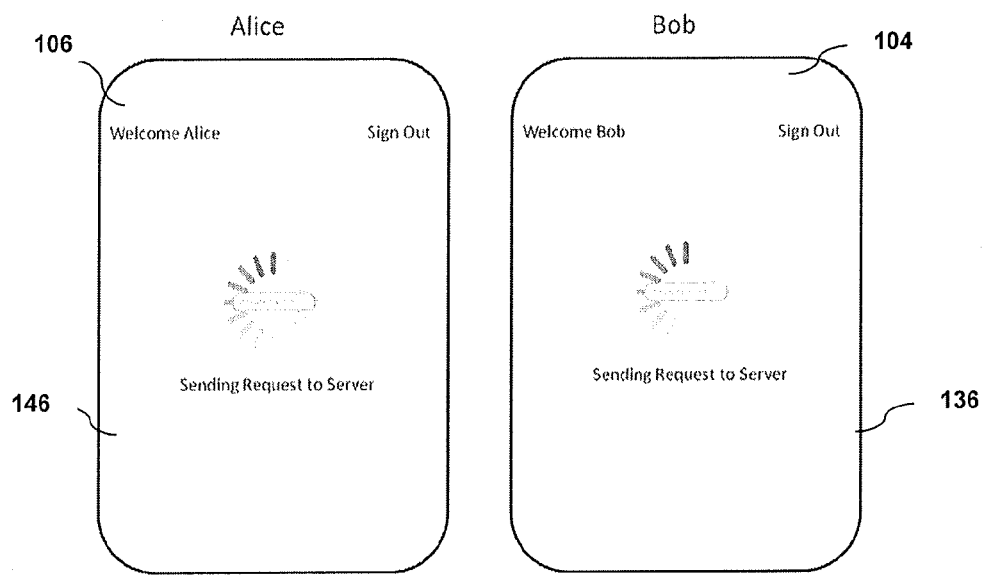
FIG. 13 illustrates peer-to-peer communication facilitated through the intermediary server, in accordance with an embodiment of the present disclosure.
Figure 14:
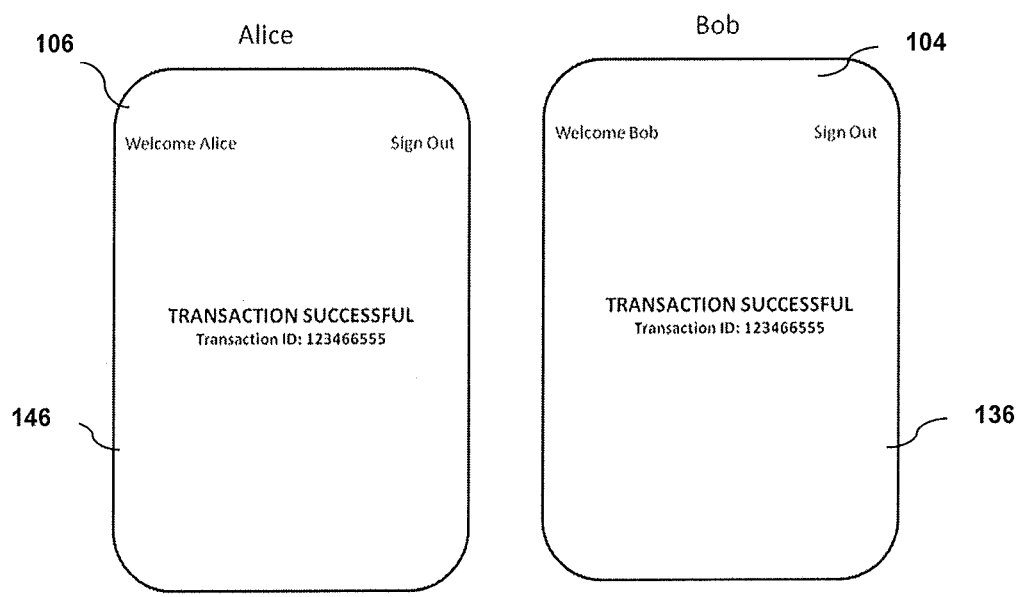
FIG. 14 illustrates receiving confirmation at the first peer device and the second peer device, in accordance with an embodiment of the present disclosure.

After matching the attributes, the first peer device 104 and the second peer device 106 may be identified as peers in the peer-to-peer communication. For the above example, the identification of the payee and the payor may be illustrated using FIG. 10. Subsequent to identifying the payee, the payor may enter an amount to be transferred to the payee on the display 146 of the second peer device 106 as shown in FIG. 11. After entering the amount on the second peer device 106, a virtual button may appear on the first peer device 104 as shown in FIG. 12. The payor may confirm the payment by touching the virtual button on the first peer device 104. After confirming the payment, the request for the payment may be sent to the intermediary server 102 as shown in FIG. 13. After the request is processed by the intermediary server 102, the first peer device 104 and the second peer device 106 may receive the confirmation for the transaction as shown in FIG. 14.

Although the description has been described considering the first peer device and the second peer device to form a peer group, two or more first peer devices and two or more second peer devices may form a peer group to establish the peer-to-peer communication and such implementations is within the scope of the present disclosure. For example, if four peer devices transmit requests to communicate, based on the trigger request and matching of the attributes of the corresponding peer device, the peer devices may be grouped using the description above.

If two or more first peer devices send the first request to the intermediary server, the intermediary server may process the request on a basis of arrival of the request. In one example, the intermediary server may process the request and generate the identification elements in an order of request received i.e., from first to last.

Although the subject matter is described considering that the payee sends the request at first to the intermediary server with a communication intent, it is obvious to person skilled in the art to implement that the payor may send the request at first to the intermediary server to initiate the transaction.

Although the system and method for facilitating peer-to-peer communication have been described in language specific to structural features and/or methods, it is to be understood that the appended claims are not necessarily limited to the specific features or methods described. Rather, the specific features and methods are disclosed as examples of implementations for peer-to-peer communication.

We claim:

1. A computer implemented method for facilitating peer-to-peer communication, the method comprising:
   identifying a first peer device and a second peer device at an intermediary server, wherein the first peer device and the second peer device are identified by receiving a first request and a second request from the first peer device and the second peer device respectively, and wherein a communication request to execute a transaction is established;
   transmitting one or more identification elements to the first peer device and the second peer device by an intermediary server, wherein the intermediary server transmits the one or more identification elements by initiating a timeout period and wherein a resultant synchronized action is triggered that sends at least one of a first trigger request and a second trigger request from the first peer device and the second peer device respectively;
   receiving the first trigger request and the second trigger request at the intermediary server, wherein the first trigger request and the second trigger request are generated by a touch/tactile event during an augmented reality interaction of the first peer device and the second peer device respectively, wherein the first trigger request and the second trigger request are indicative of a synchronized action, wherein the first trigger request and the second trigger request are indicative of a synchronized action, wherein the first trigger request and the second trigger request comprises attributes corresponding to the first peer device and the second peer device;
   matching the attributes present in the first trigger request of the first peer device and the second trigger request of the second peer device at the intermediary server to establish the synchronized action of the first peer device and the second peer device;
   forming a peer group of the first peer device and the second peer device based on the attributes matched, wherein the peer group is formed within the timeout period; and
   transmitting a response message from the intermediary server to the first peer device in response to the first trigger request from the first peer device and to the second peer device in response to the second trigger request from the second peer device, in the peer group, wherein the response message comprising details corresponding to the first peer device are transmitted to the second peer device, or vice versa, wherein the response message is transmitted in the peer group to facilitate peer-to-peer communication, wherein an augmented reality experience is enabled by the second peer device using the one or more identification elements and the second peer device prompts the first peer device through a user action to access a concealed interface on a fiducial of the first peer device.

2. The method of claim 1, wherein the identification elements for the first peer device comprises a device identifier, a server time stamp, a session identifier, the fiducial, an encoded fiducial identifier, and wherein the identification elements for the second peer device comprises a device identifier, a server time stamp, and a session identifier.

3. The method of claim 1, wherein the attributes comprises at least one of: primary attributes, secondary attributes and third attributes,
   wherein the primary attributes present in the first trigger request comprises at least one of: a device identifier, a session identifier, the communication intent and a time stamp of the first peer device,
   wherein the secondary attributes present in the first trigger request comprises at least one of: spatial coordinates of an invisible interface rendered on a fiducial visible on a display means of the first peer device, and an encoded fiducial identifier of the first peer device,
   wherein the third attributes present in the first trigger request comprises at least one of: ambient lighting/illumination, ambient noise, temperature, humidity, screen brightness, atmospheric pressure, altitude and attributes of the invisible interface of the first peer device, wherein the primary attributes present in the second trigger request comprises at least one a device identifier, a session identifier, the communication intent and a time stamp of the second peer device, and
   wherein the secondary attributes present in the second trigger request comprises at least one of: spatial coordinates of a concealed interface on a fiducial that is sensed by an optical means of the second peer device, and a fiducial identifier that is sensed by the optical means of the second peer device, and wherein the third attributes comprises at least one of: ambient lighting/illumination, ambient noise, temperature, humidity, screen brightness, atmospheric pressure, altitude and attributes of the concealed interface of the second peer device.

4. The method of claim 1, wherein the response message is associated with a status code and at least one of: a success message comprising the details corresponding to the first peer device, or vice versa; an error message when the communication intent of the first peer device and the second peer device is not known, and when the first trigger request and the second trigger request are received at the intermediary server after the time out period, or a failure of the matching, wherein the failure of matching indicates the communication intent being same from the first peer device and the second peer device.

5. A computer implemented system for facilitating peer-to-peer communication, the system comprising:
   a processor; and
   a memory coupled to the processor, wherein the processor is capable of executing program instructions stored in the memory, to:
   identify a first peer device and a second peer device at the server, wherein the first peer device and the second peer device are identified by receiving a first request and a second request from the first peer device and the second peer device respectively, and wherein a communication request to execute a transaction is established;
   transmit one or more identification elements to the first peer device and the second peer device by the intermediary server, wherein the intermediary server transmits the one or more identification elements by initiating a timeout period, and wherein a resultant synchronized action is triggered that sends at least one of a first trigger request and a second trigger request from the first peer device and the second peer device respectively;
   receive the first trigger request and the second trigger request from the first peer device and the second peer device respectively, wherein the first trigger request and the second trigger request are generated by a touch/tactile event during an augmented reality interaction of the first peer device and the second peer device respectively, wherein the first trigger request and the second trigger request are indicative of a synchronized action, wherein the first trigger request and the second trigger request comprises attributes corresponding to the first peer device and the second peer device respectively;
   match the attributes present in the first trigger request of the first peer device and the second trigger request of the second peer device to establish the synchronization action of the first peer device and the second peer device;
   form a peer group of the first peer device and the second peer device based on the attributes matched, wherein the peer group is formed within the timeout period; and
   transmit a response message from the server to the first peer device in response to the first trigger request from the first peer device and to the second peer device in response to the second trigger request from the second peer device, in the peer group, wherein the response message comprising details corresponding to the first peer device are transmitted to the second peer device, or vice versa, wherein the response message is transmitted in the peer group to facilitate peer-to-peer communication, wherein an augmented reality experience is enabled by the second peer device using the one or more identification elements and the second peer device prompts the first peer device through a user action to access a concealed interface on a fiducial of the first peer device.

6. A method for establishing peer-to-peer communication through an intermediary server, the method comprising: transmitting a first request from a first peer device to an intermediary server, wherein the first request is associated with a communication intent; receiving identification elements of the first peer device from the intermediary server; enabling an augmented reality experience with a second peer device using the identification elements and generating at least one of a touch and a tactile event, by displaying an invisible interface on a fiducial; prompting a user of the second peer device to access the invisible interface on the fiducial of the first peer device, wherein the access creates a primary event for the first second peer device, wherein creation of the primary event induces capturing of a secondary event, wherein the secondary event is captured by the sensing means of the second peer device, wherein the primary event and the secondary event indicates a synchronized action performed at an instant that is same at the first peer device and-the second peer device; transmitting a first trigger request from the first peer device to the intermediary server, wherein the first trigger request comprises attributes corresponding to the first peer device until a timeout period is initialized and tracked at the intermediary server; and receiving a response message for the first trigger request, by the first peer device, from the intermediary server, wherein the response message comprises details of the second peer device to establish peer-to-peer communication, wherein an augmented reality experience is enabled by the second peer device using the one or more identification elements and the second peer device prompts the first peer device through a user action to access a concealed interface on a fiducial of the first peer device.

7. The method of claim 6, wherein the attributes comprises primary attributes, secondary attributes and third attributes,
   wherein the primary attributes comprises at least one of: a device identifier, a session identifier, the communication intent and a time stamp of the first peer device, wherein the time stamp is indicative of a synchronization event,
   wherein the secondary attributes comprises at least one of: spatial coordinates of an invisible interface rendered on a fiducial visible on a display means of the first peer device, and an encoded fiducial identifier, and
   wherein the third attributes comprises at least one of: ambient lighting/illumination, ambient noise, temperature, humidity, screen brightness, atmospheric pressure, altitude, and attributes of the invisible interface.

8. The method of claim 6, wherein the fiducial comprises an Augmented Reality (AR) marker.

9. A first peer device for establishing peer-to-peer communication through an intermediary server, the first peer device comprising: a display a processor; and a memory coupled to the processor, wherein the processor is capable of executing program instructions stored in the memory, to: transmit a first request to an intermediary server, wherein the first request is associated with a communication intent to execute a transaction based on a communication request; receive identification elements of the first peer device from the intermediary servers wherein the identification elements are time-stamped and comprise at least one of a device identifier, a server time stamp, a session identifier, a fiducial and an encoded fiducial identifier; enable an augmented reality experience with a second peer device using the identification elements, by: displaying an invisible interface on a fiducial on the display of the first peer device; prompting a user of the second peer device to access the invisible interface on the fiducial, wherein the access creates a primary event for the first second peer device, wherein creation of the primary event induces capturing of a secondary event, wherein the secondary event is captured by a sensing means of the second first peer device, wherein the primary event and the secondary event indicates a synchronized action performed at an instant that is same at the first peer device and the second peer device; transmit a first trigger request to the intermediary server, wherein the first trigger request comprises attributes corresponding to the first peer device; and receive a response message for the first trigger request, from the intermediary server, wherein the response message comprises details of the second peer device to establish peer-to-peer communication, wherein an augmented reality experience is enabled by the second peer device using the one or more identification elements and the second peer device prompts the first peer device through a user action to access a concealed interface on a fiducial of the first peer device.

10. A method for establishing a peer-to-peer communication with peer devices through an intermediary server, the method comprising: transmitting a second request from a second peer device to an intermediary server, wherein the second request is associated with a communication intent; receiving identification elements of the second peer device from the intermediary server; enabling an augmented reality experience with a first peer device using the identification elements, by a display of the first peer device through a sensing means of the second peer device, wherein the first peer device displays a fiducial with an invisible interface, and wherein the second peer device displays a concealed interface of the fiducial when transcending over the invisible interface of the fiducial of the first peer device; prompting a user of the second peer device to access the fiducial, wherein the fiducial is viewed using an optical/sensing means of the second peer device, wherein the access creates a primary event for the first peer device, and wherein the primary event, further creates/induces a secondary event captured by the sensing means on second peer device, wherein primary event and the secondary event indicates a synchronized action performed at an instant that is same at the first peer device and the second peer device; transmitting a second trigger request from the second peer device to the intermediary server, wherein the second trigger request comprises attributes associated to the second peer device until a timeout period is initialized and tracked at the intermediary server; and receiving a response message for the second trigger request, by the second peer device, from the intermediary server, wherein the response message comprises details of the first peer device to establish peer-to-peer communication, wherein an augmented reality experience is enabled by the second peer device using the one or more identification elements and the second peer device prompts the first peer device through a user action to access a concealed interface on a fiducial of the first peer device.

11. A second peer device for establishing a peer-to-peer communication through an intermediary server, the second peer device comprising: a processor; and a memory coupled to the processor, wherein the processor is capable of executing a plurality of modules stored in the memory, to: transmit a second request from a second peer device to an intermediary server, wherein the second request is associated with a communication intent; receive identification elements of the second peer device from the intermediary server; enable an augmented reality experience with a first peer device using the identification elements, by viewing a display of the first peer device through a sensing means of the second peer device, wherein the first peer device displays a fiducial with an invisible interface, and wherein the second peer device displays a concealed interface of the fiducial transcending over the invisible interface of the fiducial of the first peer device; prompting a user of the second peer device to access the fiducial, wherein the fiducial is viewed using an optical/sensing means of the second peer device, wherein the access creates a primary event for the first peer device, and wherein the primary event further creates/induces a secondary event captured by the sensing means on second peer device, wherein primary event and the secondary event indicates a synchronized action performed at an instant that is same at the first peer device and the second peer device; transmit a second trigger request to the intermediary server, wherein the second trigger request comprises attributes associated to the second peer device; and receive a response message for the second trigger request, from the intermediary server, wherein the response message comprises details of the first peer device to establish peer-to-peer communication and the details correspond to matching of the attributes for a first trigger request and a second trigger request received after a timeout period, wherein an augmented reality experience is enabled by the second peer device using the one or more identification elements and the second peer device prompts the first peer device through a user action to access a concealed interface on a fiducial of the first peer device.

* * * * *